US008726485B2

(12) United States Patent
Weng et al.

(10) Patent No.: US 8,726,485 B2
(45) Date of Patent: May 20, 2014

(54) HOUSING FOR ELECTRONIC DEVICE AND METHOD FOR MAKING THE SAME

(75) Inventors: Zhu-Sha Weng, Shenzhen (CN); Yong-Gang Zhu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 282 days.

(21) Appl. No.: 13/089,417

(22) Filed: Apr. 19, 2011

(65) Prior Publication Data
US 2012/0234574 A1    Sep. 20, 2012

(30) Foreign Application Priority Data
Mar. 18, 2011    (CN) .......................... 2011 1 0066155

(51) Int. Cl.
| | | |
|---|---|---|
| *B21B 1/46* | (2006.01) | |
| *B21B 13/22* | (2006.01) | |
| *B22D 11/126* | (2006.01) | |
| *B22D 11/128* | (2006.01) | |
| *B23P 17/00* | (2006.01) | |
| *B23P 25/00* | (2006.01) | |

(52) U.S. Cl.
USPC ................ 29/527.2; 29/458; 451/29; 451/38; 430/313; 427/154

(58) Field of Classification Search
USPC .......... 174/50, 546, 565, 524; 451/38, 29, 30, 451/31; 430/313, 311, 314, 315, 323, 325, 430/326, 14; 427/154, 300, 327; 361/679.01; 29/527.4, 557, 558, 428, 29/458, 459, 460, 527.1, 527.2
See application file for complete search history.

(56) References Cited

U.S. PATENT DOCUMENTS

| | | | | | |
|---|---|---|---|---|---|
| 2,617,225 | A | * | 11/1952 | O'Brien | 451/29 |
| 3,808,751 | A | * | 5/1974 | Usui | 451/31 |
| 4,133,919 | A | * | 1/1979 | Parsons | 427/259 |
| 4,139,409 | A | * | 2/1979 | Macken et al. | 216/33 |
| 4,456,680 | A | * | 6/1984 | Nakamura et al. | 430/258 |
| 4,468,453 | A | * | 8/1984 | Nakamura et al. | 430/269 |
| 4,612,737 | A | * | 9/1986 | Adee et al. | 451/29 |
| 4,716,096 | A | * | 12/1987 | Cooper et al. | 430/323 |
| 4,834,833 | A | * | 5/1989 | Palmer | 216/48 |
| 5,069,004 | A | * | 12/1991 | Gillenwater | 451/29 |
| 5,260,173 | A | * | 11/1993 | Birkholm | 430/325 |
| 6,118,377 | A | * | 9/2000 | Bonkowski et al. | 340/572.1 |
| 6,678,093 | B1 | * | 1/2004 | Scobey et al. | 359/578 |
| 2007/0298231 | A1 | * | 12/2007 | Ito et al. | 428/213 |
| 2011/0005796 | A1 | * | 1/2011 | Wu et al. | 174/50 |
| 2011/0005797 | A1 | * | 1/2011 | Tsao et al. | 174/50 |
| 2011/0048754 | A1 | * | 3/2011 | Xiong et al. | 174/50 |
| 2011/0050055 | A1 | * | 3/2011 | Zhu et al. | 312/223.1 |
| 2011/0088924 | A1 | * | 4/2011 | Nashner | 174/50 |
| 2011/0180294 | A1 | * | 7/2011 | Qin et al. | 174/50 |

(Continued)

*Primary Examiner* — David Bryant
*Assistant Examiner* — Christopher M Koehler
(74) *Attorney, Agent, or Firm* — Novak Druce Connolly Bove + Quigg LLP

(57) ABSTRACT

A housing for an electronic device includes a base and a pattern layer formed on the base. The pattern layer includes a blasting area and peripheral area, the blasting area has rough surface formed by sandblasting, the blasting area is a pattern section and has a width of at least 70 micrometer; the peripheral area has a slippery surface a peripheral section of the pattern section. The disclosure also described a method to make the housing.

10 Claims, 5 Drawing Sheets

(56) References Cited

U.S. PATENT DOCUMENTS

2011/0183091 A1* 7/2011 Zhu et al. .................... 428/34.6
2012/0062820 A1* 3/2012 Sasaki et al. .................... 349/64
2012/0304451 A1* 12/2012 Park et al. .................... 29/527.2

* cited by examiner

HOUSING FOR ELECTRONIC DEVICE AND METHOD FOR MAKING THE SAME

BACKGROUND

1. Technical Field

The present disclosure relates to housings for electronic devices and a method for making the same.

2. Description of the Related Art

With development of electronic technology, more attention is being paid to the comfort of the consumer. The external surfaces of device housings may be too slippery or rough, therefore it is hard to supply a comfortable feeling for the user when using. Furthermore, patterns on housings of electronic devices are typically formed by printing. The printed patterns may often have an invariable and tedious appearance without sufficient attractiveness to the consumers.

Therefore, there is room for improvement within the art.

BRIEF DESCRIPTION OF THE DRAWINGS

Many aspects of the present housing of electronic device and method for making the same can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
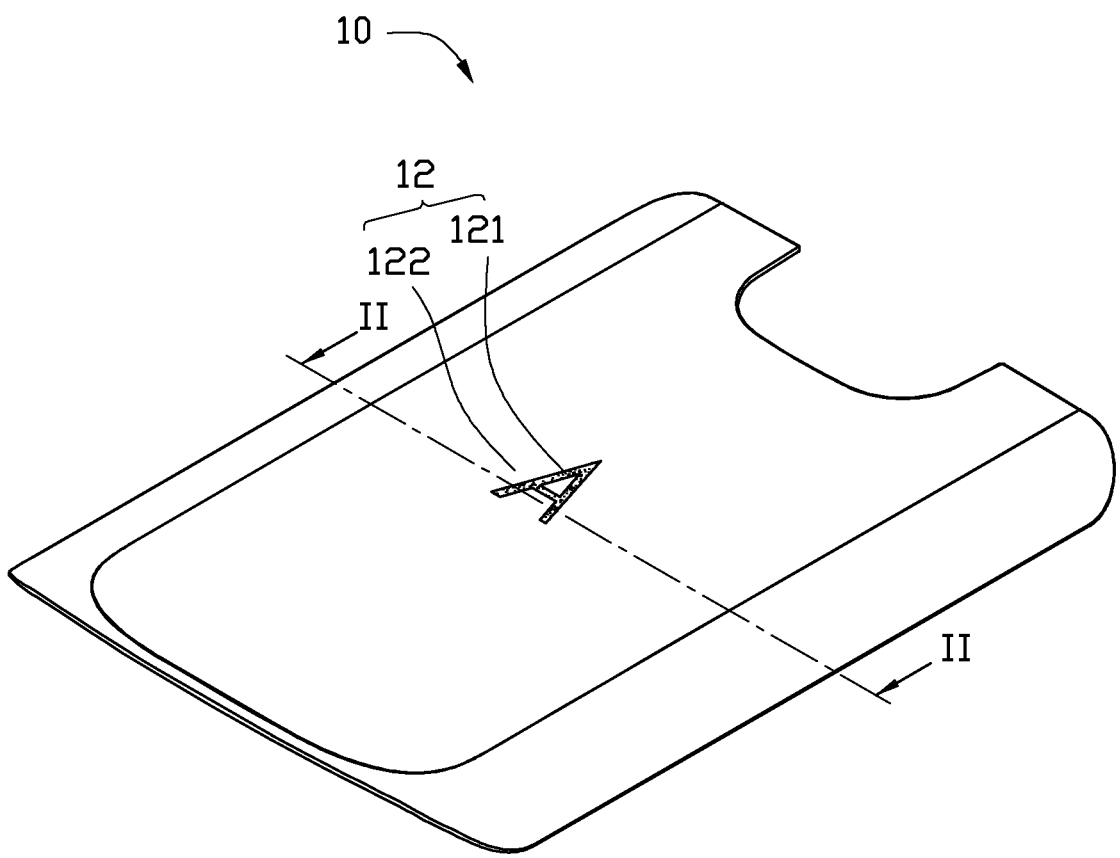
FIG. 1 is a front isometric view of a housing of an electronic device according to an exemplary embodiment.
Figure 2:
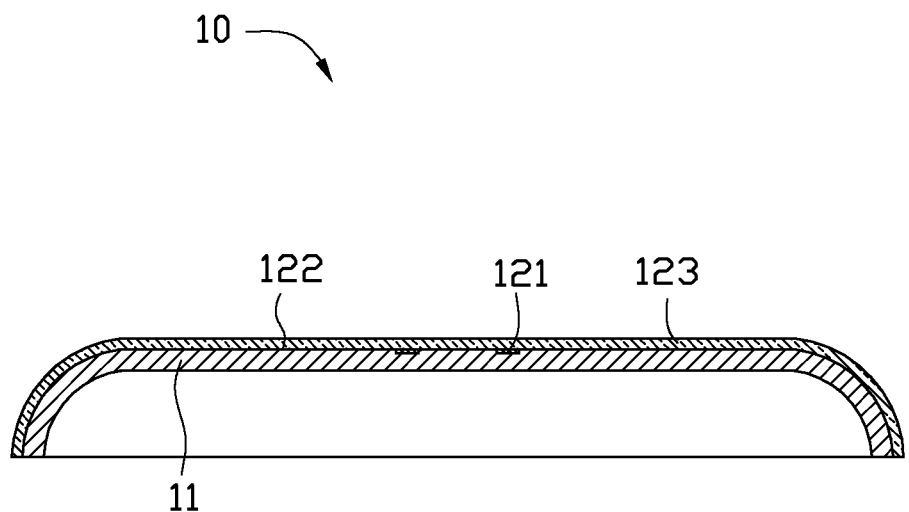
FIG. 2 is a sectional schematic view of the housing shown in FIG. 1 along a line II-II.

FIGS. 1 and 2 show an exemplary embodiment of a housing 10 of an electronic device such as a mobile phone. The housing 100 includes a base 11 and a pattern layer 12 integrally formed on the external surface of the base 11. The base 11 can be stainless steel, or Aluminum (Al). A thickness of the base 11 can be or exceed 0.3 mm, and is about 0.5 mm in this exemplary embodiment. The pattern layer 12 includes a blasting area 121 and a peripheral area 122. The blasting area 121 has a rough surface formed by sandblasting. The blasting area 121 can be a pattern section comprised of a plurality of lines with a width of at least 70 micrometer. In other words, the blasting area 121 has the width of at least 70 micrometer. The peripheral area 122 has slippery surface and can be an adjacent area of the pattern section. The housing 10 can further include a transparent or translucent decorated layer 123 covering the pattern layer 12. The decorated layer 123 can be formed by physical vapor deposition (PVD).

Figure 3:
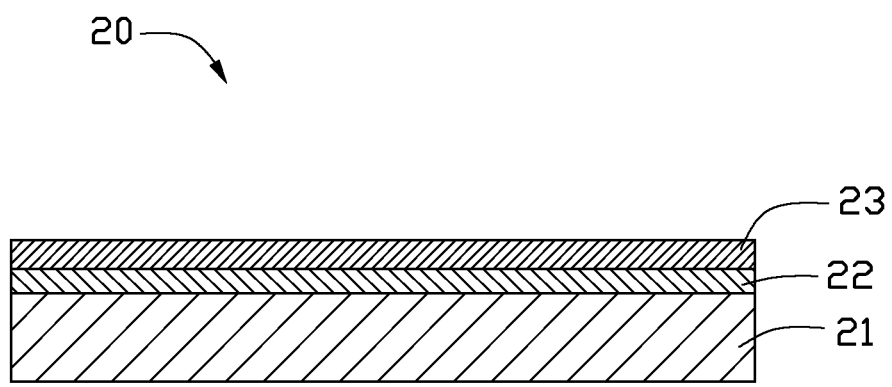
FIG. 3 is a sectional schematic view of a film base when making a shielding film.
Figure 4:
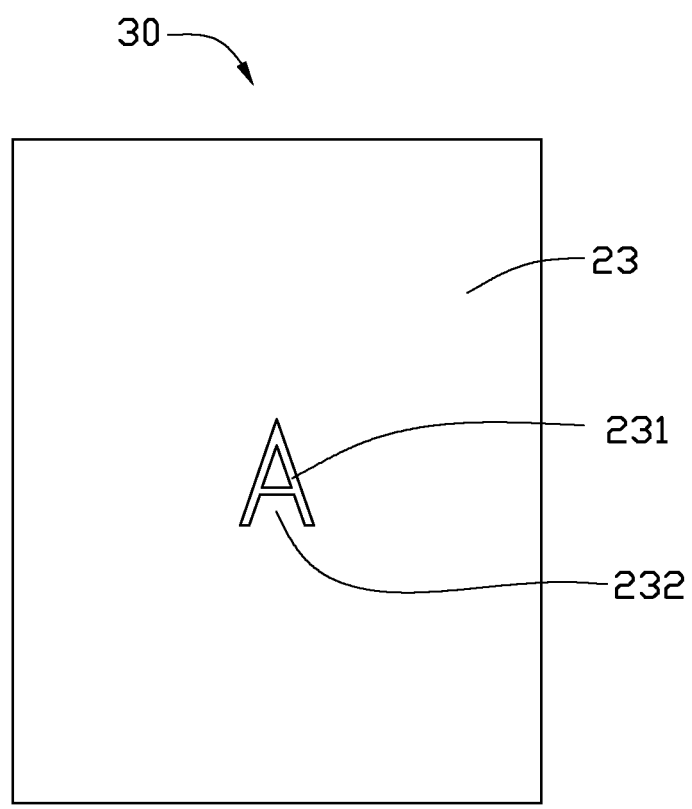
FIG. 4 is a front schematic view of the shielding film after process.

A method for making the housing of electronic device comprises following steps:

Step 1: referring to FIG. 4, a shielding film 30 can be fabricated by computer editing in combination with a photography process. The photography process includes steps such as exposure, development, and drying. Referring to FIG. 3, a film base 20 is provided and includes a base layer 21, an intermediate layer 22, and an emulsion layer 23. The base layer 21 is thick and used to ensure the emulsion layer 23 is uniform without deformation when processing the film base 20. The base layer 21 cannot be broken through during the sandblasting and should be peeled off from the film base 20 before the sandblasting. The intermediate layer 22 located between the base layer 21 and the emulsion layer 23 has a thickness of 1-2 micrometer. The intermediate layer 22 facilitates the peeling of the base layer 21 from the emulsion layer 23. The intermediate layer 22 is thin and can be broken through during the sandblasting. The emulsion layer 23 can be photosensitive, water-soluble, and blasting-resistant for fabricating a bore area 231 (shown in FIG. 4) corresponding to blasting area 121 of the pattern layer 12.

To fabricate the bore area 231 in the emulsion layer 23 of the film base 20, a pattern corresponding to the blasting area 121 can be programmed by a computer and printed on the emulsion layer 23. Lines with the width of at least 70 micrometers form the pattern. Then, the film base 20 is exposed to the light for exposure of the emulsion layer 23. The emulsion layer 23 forms a curing area and an un-curing area. The curing area is cured due to light. Accordingly, the un-curing area is not cured because it is shielded by the pattern. Next, the film base 20 is placed into a solution to develop the emulsion layer. Since the emulsion layer 23 is water-soluble, thus the un-cured area is dissolved, and defines the bore area 231 corresponding to the printed pattern. Accordingly, the curing area cannot be dissolved and becomes a shielding area 232 of the emulsion layer 23. Finally, the film base 20 is dried. Therefore, the shielding film 30 has been processed on the film base 20.

In present exemplary embodiment, to fabricate a bore area with a width of 70-80 mm, the width precision of the bore area 231 in the emulsion layer 23 is influenced by the steps of exposure and development of the emulsion layer 23. During exposure of the emulsion layer 23, the film base 20 is placed under a lamp (not shown) and the emulsion layer 23 faces the lamp. Related parameters can be chosen from one of groups listed in the following table:

| Type of lamp | Distance between the lamp to the emulsion layer | Exposure time |
| --- | --- | --- |
| 5 kw metal halogen lamp | 100 cm | 10~20 s |
| 3 kw metal halogen lamp | 91 cm | 20~30 s |
| 1 kw metal halogen lamp | 45 cm | 30~50 s |
| dark fluorescent lamp | 10 cm | 60~80 s |
| white fluorescent lamp | 10 cm | 140~160 s |
| grey fluorescent lamp | 100 cm | 40~50 s |

During development of the emulsion layer 23, the film base 20 is immersed into the solution such as water at a temperature no higher than 49 degrees centigrade for about half a minute. The film base 20 is taken from the solution. The emulsion layer 23 is sprayed with a pressure on the emulsion layer 23 in a range of 344-550 kpa. Accordingly, the bore area 231 of the emulsion layer 23 is presented.

Step 2: to attach the shielding film 30 on the base 11. The base 11 is provided, the shielding film 30 is attached on the base 11, with the emulsion layer 23 evenly contacting with the surface of the base 11 by glue.

Figure 5:
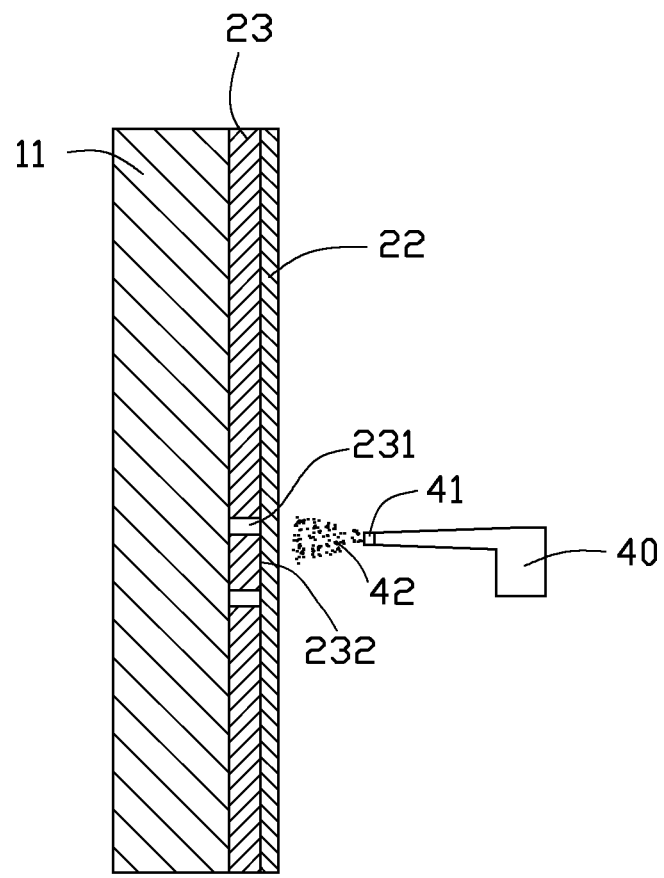
FIG. 5 is a schematic view of the housing during processing.

Step 3: to sand blast the base 11 attached the shielding film 30. Due to the base layer 21 being thick it cannot be broken through by the sand blasting, the base layer 21 is peeled off before the sandblasting. FIG. 5 shows a nozzle 41 of a sandblast gun 40 aligning with the surface of the base 11. The diameter of the nozzle 41 is in a range of 0.09-0.10 centimeters, a distance between the nozzle 41 to the base 11 is adjusted in a range of 15-20 centimeter, and a pressure on the base 11 is no more than $1.72*10^5$ pa. During the sandblasting, blasting material 42 is ejected at the base 11. The blasting material 42 break through the intermediate layer 22 and pass through the bore area 231 of the emulsion layer 23 to strike and abrade the surface of the base 11. The shielding area 232 of the emulsion layer 23 is blasting-resistant and thus cannot be broken through, thus the blasting area 121 can be formed corresponding to the bore area 231 of the emulsion layer 23. The blasting material 42 may be comprised of emery, chromium iron alloy, copper ore, quartz sand, or ceramic base sand.

Step 4: to eliminate the emulsion layer 23 attached on the base 11, the base 11 is placed into a solvent where the cured emulsion layer 23 is resolved. The shielding area 232 of the emulsion layer 23 is removed to form the peripheral area 122 of the pattern layer 12. In present exemplary embodiment, the base 11 is immersed in an organic solution about 10-15 minutes. At this time, the pattern layer 12 on the base 11 is achieved.

Step 5: to form a transparent or translucent decorated layer 123 on the pattern layer 12, the decorated layer 123 can be coated electronically or formed by PVD.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A method for making a housing of electronic device, comprising:
    making a shielding film, the shielding film including a base layer, an intermediate layer and an emulsion layer, the emulsion layer defining a bore area and a shielding area adjacent to the bore area;
    attaching the shielding film on a base, the emulsion layer contacting with a surface of the base;
    peeling the base layer from the shielding film;
    blasting the intermediate layer, the emulsion layer, and the base with a blasting material, the blasting material breaking through the intermediate layer and passing through the bore area of the emulsion layer to abrade the surface of the base and forming a blasting area, the blasting area corresponding to the bore area of the emulsion layer;
    eliminating the emulsion layer to expose a peripheral area on the surface of the base, the peripheral area corresponding to the shielding area, the blasting area and the peripheral area corporately forming a pattern layer.

2. The method for making a housing of electronic device as claimed in claim 1, wherein further comprising forming a transparent/translucent decorated layer on the pattern layer.

3. The method for making a housing of electronic device as claimed in claim 2, wherein the decorated layer is formed on the pattern layer by physical vapor deposition (PVD).

4. The method for making a housing of electronic device as claimed in claim 1, wherein to make the shielding film, providing a film base including the base layer, the intermediate layer and the emulsion layer, and processing the emulsion layer to define the bore area and the shielding area.

5. The method for making a housing of electronic device as claimed in claim 4, wherein during processing the emulsion layer, printing a pattern on the emulsion layer, making the emulsion layer exposure and development to form the bore area and the shielding area.

6. The method for making a housing of electronic device as claimed in claim 5, wherein to fabricate the bore area with a width 70-80 micrometer, during exposure of the emulsion layer, related parameters can be choose one group from following table:

| Type of lamp | Distance between the lamp to the emulsion layer | Exposure time |
| --- | --- | --- |
| 5 kw metal halogen lamp | 100 cm | 10~20 s |
| 3 kw metal halogen lamp | 91 cm | 20~30 s |
| 1 kw metal halogen lamp | 45 cm | 30~50 s |
| dark fluorescent lamp | 10 cm | 60~80 s |
| white fluorescent lamp | 10 cm | 140~160 s |
| grey fluorescent lamp | 100 cm | 40~50 s. |

7. The method for making a housing of electronic device as claimed in claim 5, wherein during development of the emulsion layer, soaking the film base in a solution, with a temperature of the solution no more than 49 degree centigrade, after half a minute, taking the film base out from the solution, spraying the emulsion layer, with a pressure on the emulsion layer in a range of 344-550 kpa, defining the bore area in the emulsion layer.

8. The method for making a housing of electronic device as claimed in claim 1, wherein during eliminating the emulsion layer, placing the base into a solvent and dissolving the emulsion layer.

9. The method for making a housing of electronic device as claimed in claim 1, wherein the intermediate layer is located between the base layer and the emulsion layer, the intermediate layer has a thickness in a range from 1-2 micrometer.

10. The method for making a housing of electronic device as claimed in claim 1, wherein the emulsion layer is photosensitive, water-soluble, and blasting-resistant.

* * * * *